United States Patent
Huang et al.

(10) Patent No.: US 7,898,227 B2
(45) Date of Patent: Mar. 1, 2011

(54) NON-SYNCHRONOUS BOOST CONVERTER INCLUDING LOW-VOLTAGE DEVICE FOR LOAD DISCONNECTION

(75) Inventors: Tsung-Wei Huang, Taipei (TW); Shui-Mu Lin, Longjing Township, Taichung County (TW); Jien-Sheng Chen, Miaoli County (TW); Kwan-Jen Chu, Hsinchu (TW)

(73) Assignee: Richtek Technology Corp., Hsinchu (TW)

( * ) Notice: Subject to any disclaimer, the term of this patent is extended or adjusted under 35 U.S.C. 154(b) by 243 days.

(21) Appl. No.: 12/318,665

(22) Filed: Jan. 6, 2009

(65) Prior Publication Data
US 2010/0026257 A1     Feb. 4, 2010

(30) Foreign Application Priority Data
Jan. 8, 2008    (TW) ............................... 97100735 A

(51) Int. Cl.
*G05F 1/10*     (2006.01)

(52) U.S. Cl. ...................................................... 323/222
(58) Field of Classification Search ......... 323/222–226, 323/268, 271, 282, 284, 285; 363/50
See application file for complete search history.

(56) References Cited

U.S. PATENT DOCUMENTS

| | | | | |
|---|---|---|---|---|
| 6,522,108 B2 * | 2/2003 | Prager et al. | ................. | 323/222 |
| 7,002,330 B2 * | 2/2006 | Kitani et al. | ................. | 323/284 |
| 7,126,314 B2 * | 10/2006 | McGinty et al. | ............ | 323/222 |
| 2005/0269999 A1 * | 12/2005 | Liu et al. | .................... | 323/222 |

* cited by examiner

*Primary Examiner*—Matthew V Nguyen
(74) *Attorney, Agent, or Firm*—Rosenberg, Klein & Lee

(57) ABSTRACT

A non-synchronous boost converter includes a low-voltage device connected between the input voltage terminal and the output voltage terminal of the converter. When the converter is shutdown, the low-voltage device disconnects the output voltage terminal and the input voltage terminal. Since it is a low-voltage device used in the converter for load disconnection, the efficiency of the converter is improved with lower cost.

12 Claims, 4 Drawing Sheets

US 7,898,227 B2

NON-SYNCHRONOUS BOOST CONVERTER INCLUDING LOW-VOLTAGE DEVICE FOR LOAD DISCONNECTION

FIELD OF THE INVENTION

The present invention is related generally to voltage converters and, more particularly, to a non-synchronous boost converter using a low-voltage device for load disconnection.

BACKGROUND OF THE INVENTION

As shown in FIG. 1, a conventional non-synchronous boost converter 10 generates output current by switching a power switch (not shown) in a controller chip 12, which flows through an inductor L1 and a Schottky diode D1 to charge a capacitor C2 to generate an output voltage VOUT. Since the forward voltage VF of the Schottky diode D1 is small, this converter circuit will have good efficiency in power conversion. However, when the boost converter 10 is shutdown by a signal Enable but the input voltage VIN provided by batteries is still high, for example at 3.7V, the Schottky diode D1 will be still conductive and thereby produce a non-zero output voltage, for example 3.3V, at the output voltage terminal VOUT. Therefore, leakage current will be present in this case and flow to the ground terminal GND through divider resistors R1 and R2, even the converter 10 has been shutdown. To avoid this leakage current, U.S. Pat. No. 7,126,314 to McGinty et al. replaces the general Schottky diode D1 with a gate-controlled Schottky diode and employs a LDMOS or JFET to provide a control signal to turn off the gate-controlled Schottky diode for load disconnection when the converter is shutdown. Another approach to avoid the leakage current is to insert a switch between the Schottky diode D1 and the output voltage terminal VOUT for load disconnection. However, the output VOUT of the boost converter 10 is a high voltage that typically ranges between 10V and 40V, and thus the switch must be a high-voltage device. Unfortunately, a high-voltage device not only is costly but also has a greater on-resistance, thereby causing poor efficiency in the converter circuit.

Therefore, it is desired a boost converter with a low-voltage device for load disconnection.

SUMMARY OF THE INVENTION

An object of the present invention is to provide a non-synchronous boost converter including low-voltage device for load disconnection.

Another object of the present invention is to provide a non-synchronous boost converter having short circuit protection and load disconnection functions.

Yet another object of the present invention is to provide a non-synchronous boost converter having constant pre-charge current and short circuit protection current.

According to the present invention, a non-synchronous boost converter comprises an inductor connected between an input terminal and a switched node, a diode connected between the switched node and an output voltage terminal, a capacitor connected to the output voltage terminal, a power switch connected to the switched node and switched to generate an output current flowing through the inductor and the diode to charge the capacitor to generate an output voltage, a load disconnecting transistor connected between the diode and the output voltage terminal, and a clamping circuit connected to the load disconnecting transistor to clamp the voltage between the gate and the source of the load disconnecting transistor. The load disconnecting transistor is a low-voltage device and disconnects the output voltage terminal from the input voltage terminal when the converter is shutdown.

Preferably, a short circuit protection circuit is connected to the output voltage terminal, which monitors the output voltage and triggers a short circuit signal to turn off the power switch when the output voltage is lower than a threshold value.

Preferably, a current supply circuit is connected to the output voltage terminal to provide stable pre-charge current and short circuit protection current to the capacitor.

Preferably, the current supply circuit comprises a current mirror composed of the load disconnecting transistor as a reference branch and another transistor as a mirror branch to mirror the reference current on the reference branch to generate the pre-charge current and the short circuit protection current.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
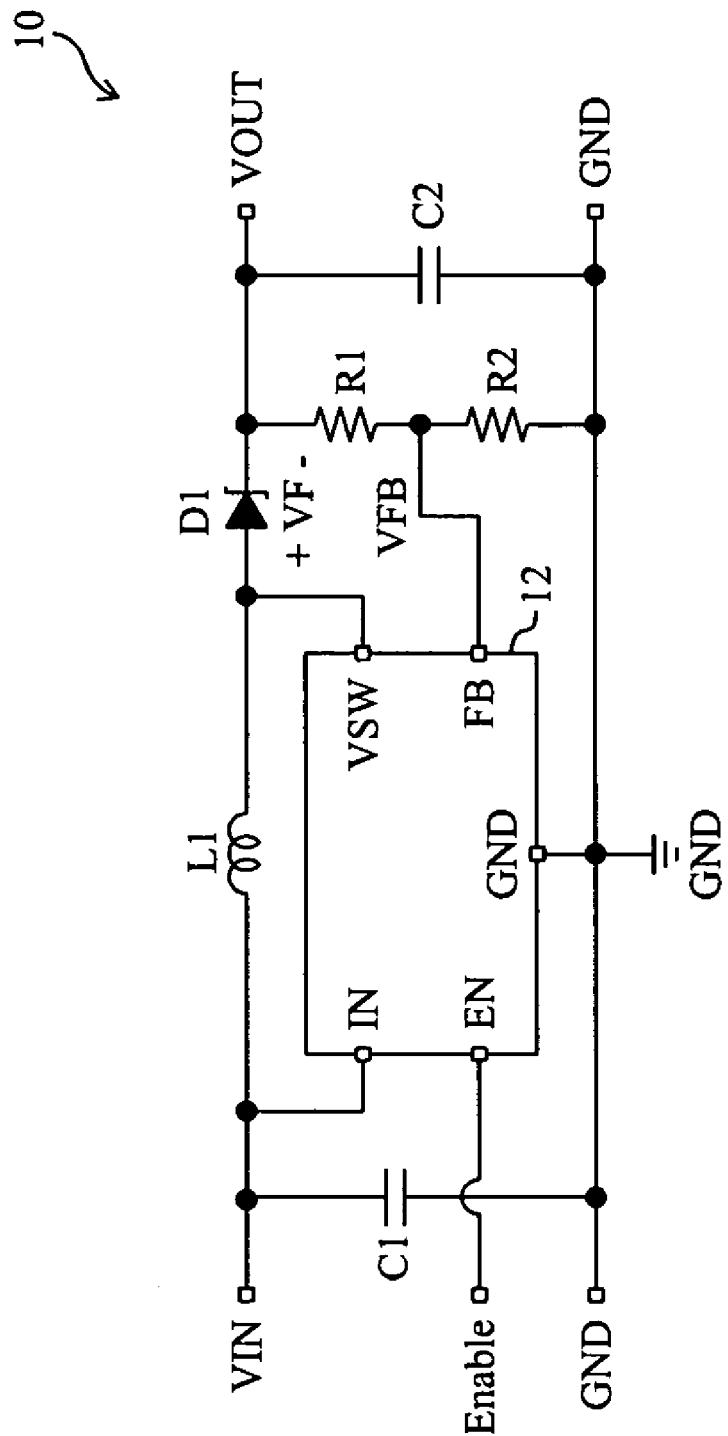
FIG. 1 is a circuit diagram of a conventional non-synchronous boost converter.
Figure 2:
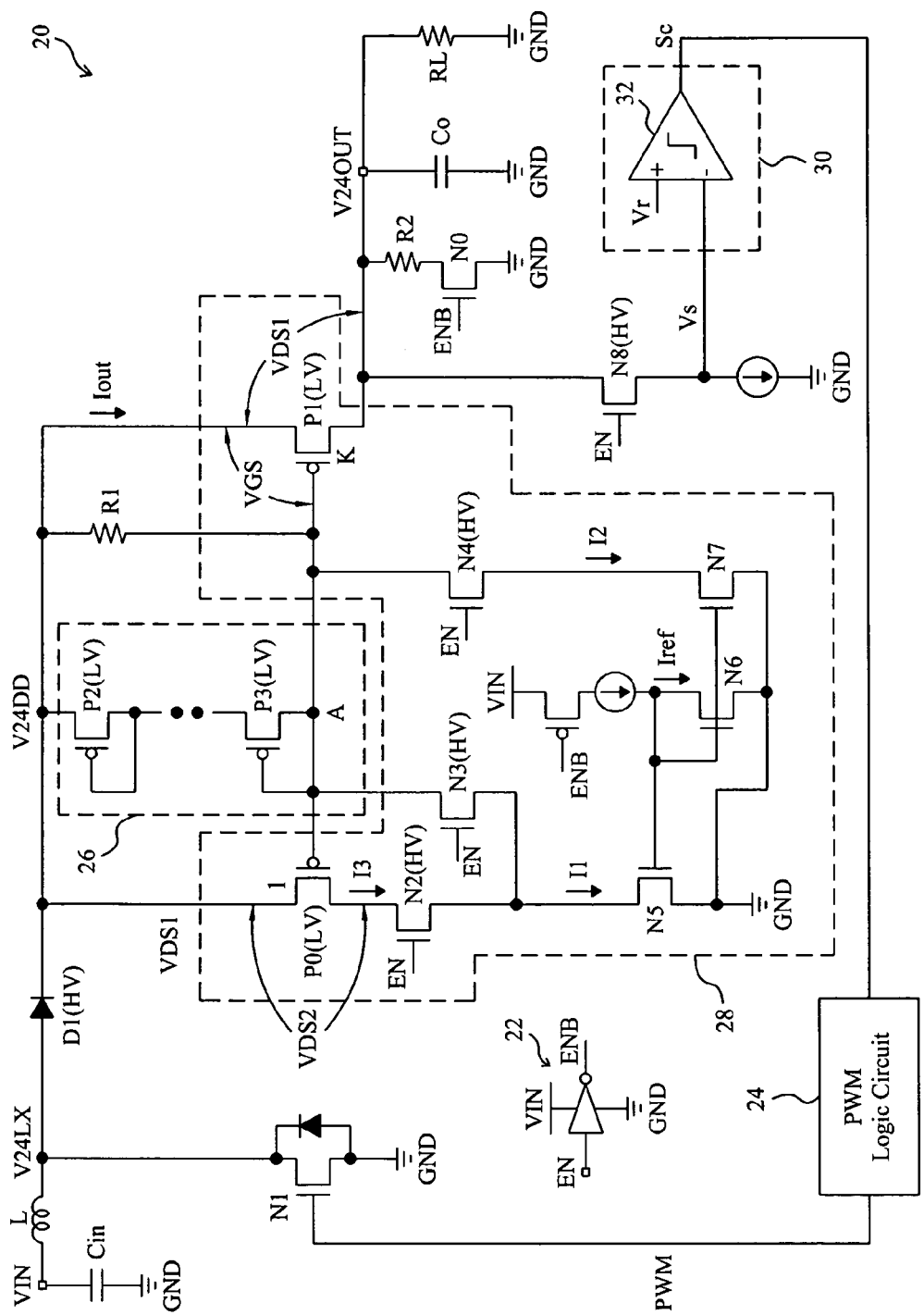
FIG. 2 is a circuit diagram of an embodiment according to the present invention.

FIG. 2 shows an embodiment according to the present invention. In a non-synchronous boost converter 20, an input voltage terminal VIN is used to connect to a power source to receive an input voltage, an inductor L is connected between the input voltage terminal VIN and a switched node V24LX, a power switch N1 is connected between the switched node V24LX and a ground terminal GND, an output voltage terminal V24OUT is used to provide an output voltage, an embedded diode D1 is connected between the switched node V24LX and the output voltage terminal V24OUT, a capacitor Co is connected to the output voltage terminal V24OUT, and a transistor P1 is connected between the diode D1 and the output voltage terminal V24OUT. In response to a control signal PWM provided by a PWM logic circuit 24, the power switch N1 is switched to generate an output current Iout flowing through the inductor L, the embedded diode D1 and the transistor P1 to charge the capacitor Co to generate the output voltage V24OUT for load RL. An enable signal EN is inverted by an inverter 22 to generate a signal ENB. The transistor P1 is a low-voltage device and serves for load disconnection. In order to prevent the load disconnecting transistor P1 from being damaged by high voltage on the output voltage terminal V24OUT, a clamping circuit 26 is connected between the gate and the source of the load disconnecting transistor P1 to clamp the gate-source voltage VGS of the load disconnecting transistor P1 not greater than some threshold value, for example 5V. A current supply circuit 28 including a transistor P0 in association with the load disconnecting transistor P1 to constitute a current mirror is connected to the output voltage terminal V24OUT to provide a constant pre-charge current and a short circuit protection current to charge the capacitor Co. In the current supply circuit 28, transistors N5, N6 and N7 constitute a current mirror to generate currents I1 and I2 by mirroring the reference current Iref established by the transistor N6, which will determine the reference current I3 in the current mirror composed of the transistors P0 and P1. A short circuit protection circuit 30 monitors the output voltage V24OUT and triggers a short circuit signal Sc to signal the PWM logic circuit 24 to switch off the power switch N1 when the output voltage terminal V24OUT suffers a short circuit event, i.e. shorted to the ground terminal GND.

Figure 3:
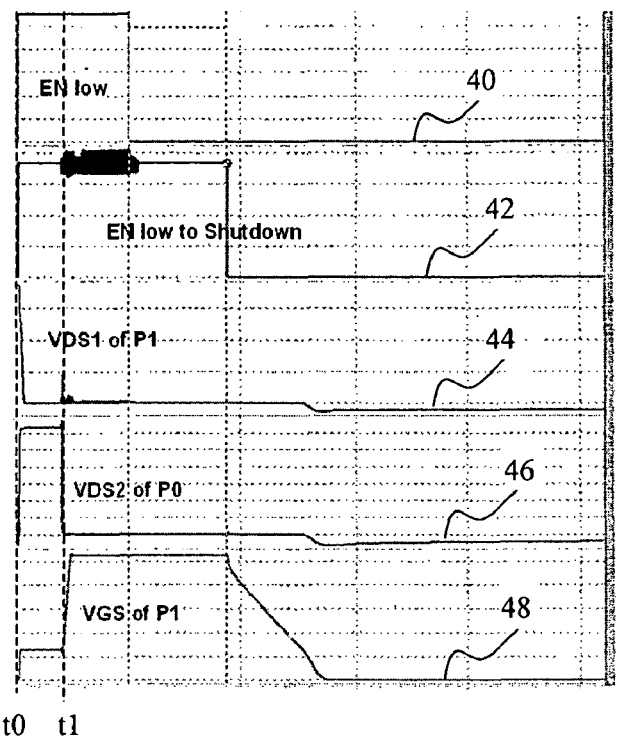
FIG. 3 is a waveform diagram illustrating how the gate-source voltage of the load disconnecting transistor in the converter of FIG. 2 is clamped.
Figure 4:
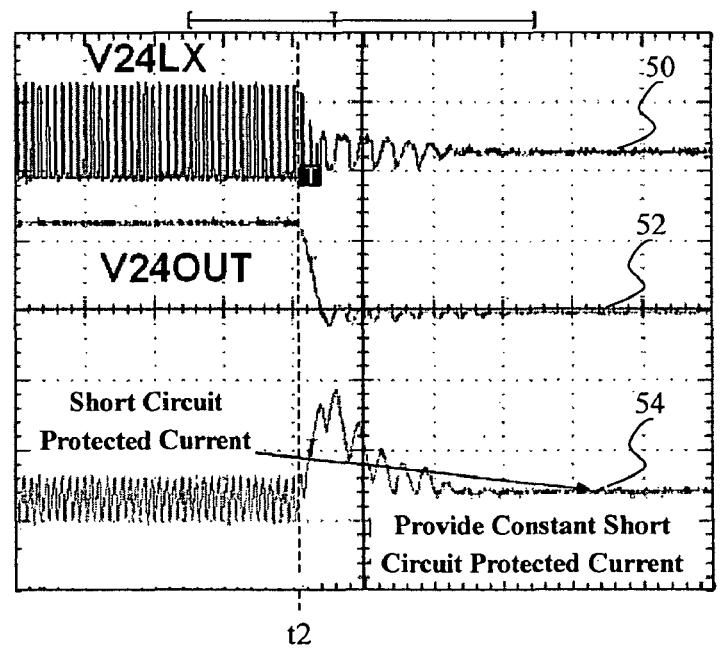
FIG. 4 is a waveform diagram illustrating the short circuit protection in the converter of FIG. 2.
Figure 5:
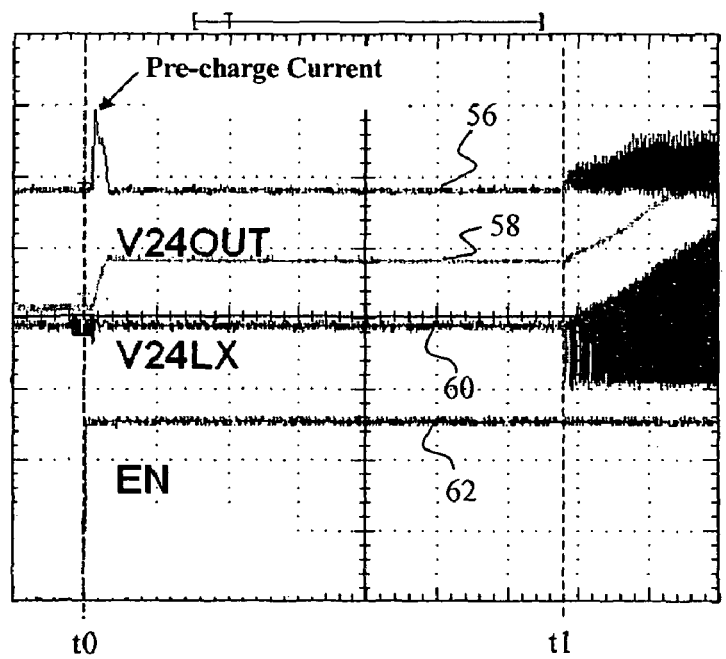
FIG. 5 is a waveform diagram illustrating the pre-charge current in the converter of FIG. 2.
Figure 6:
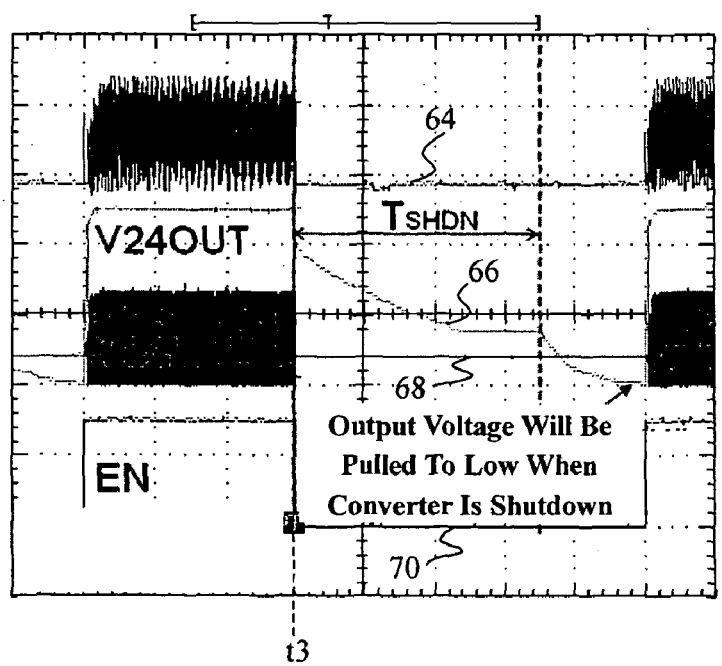
FIG. 6 is a waveform diagram illustrating the load disconnection in the converter of FIG. 2.

FIG. 3 illustrates how the voltage VGS is clamped in the converter 20, in which waveform 40 represents the external enable signal provided to an external pin of the converter 20, waveform 42 represents the enable signal EN that has been delayed within the converter 20, waveform 44 represents the voltage VDS1 between the drain and the source of the load disconnecting transistor P1, waveform 46 represents the voltage VDS2 between the drain and the source of the transistor P0, and waveform 48 represents the voltage VGS between the gate and the source of the load disconnecting transistor P1. FIG. 4 illustrates the short circuit protection in the converter 20, in which waveform 50 represents the voltage on the switched node V24LX, waveform 52 represents the output voltage V24OUT, and waveform 54 represents the output current Iout. FIG. 5 illustrates the pre-charge current in the converter 20, in which waveform 56 represents the output current Iout, waveform 58 represents the output voltage V24OUT, waveform 60 represents the voltage on the switched node V24LX, and waveform 62 represents the enable signal EN. FIG. 6 illustrates the load disconnection in the converter 20, in which waveform 64 represents the output current Iout, waveform 66 represents the output voltage V24OUT, waveform 68 represents the voltage on the switched node V24LX, and waveform 70 represents the enable signal EN.

Referring to FIGS. 2, 3 and 5, when the enable signal EN transits to high, as shown at time t0, the converter 20 is enabled. Assuming that the input voltage VIN is 3.7V, since the PWM logic circuit 24 has not asserted the control signal PWM to switch the power switch N1 yet, the voltage on the node V24DD between the diode D1 and the load disconnecting transistor P1 is approximately equal to the input voltage VIN. Also assuming that the clamping circuit 26 includes a diode string composed of five low-voltage transistors P2-P3 serially connected together, each configured as a diode and having a forward voltage of 1V, the maximum value of the voltage VGS between the gate and the source of the load disconnecting transistor P1 is clamped to around 5V. Further, since the voltage on the node V24DD is only about 3.7V at this time, the voltage on the node A will be equal to zero, and hence the transistors P0, P1, N2, N3 and N4 in the current supply circuit 28 are all on. In the current mirror composed of the transistors P0 and P1, the transistor P0 functions as a reference branch and the load disconnecting transistor P1 functions as a mirror branch that mirrors the reference current I3 on the reference branch to provide a constant pre-charge current Iout for charging the capacitor Co, thereby increasing the output voltage V24OUT to 3.7V, as shown by the waveform 56 in FIG. 5. Because the current I3=I1+I2, the pre-charge current has the value $$Iout = (I1+I2) \times K,  \quad [Eq-1]$$

where K is the current mirror ratio of the transistors P1 and P0. When the output voltage V24OUT is charged to 3.7V by the pre-charge current, the transistors N2, N3 and N4 are all turned off, and the voltage VDS1 between the drain and the source of the load disconnecting transistor P1 would decrease to zero accordingly, as shown by the waveform 44 in FIG. 3. Further, the voltage VDS2 between the drain and the source of the transistor P0 is about 1.2V, so that the voltage VGS between the gate and the source of the load disconnecting transistor P1 is also pulled high to around 1.2V, as shown by the waveforms 46 and 48 in FIG. 3. At time t1, the PWM logic circuit 24 asserts the control signal PWM to switch the power switch N1, so that the output voltage V24OUT begins to increase. Accordingly, the voltage VGS also increases but is eventually clamped to around 5V by the clamping circuit 26.

Referring to FIGS. 2 and 4, when the output voltage terminal V24OUT is shorted to the ground terminal GND as shown at time t2, the output current Iout increases and both the voltages on the switched node V24LX and the output voltage terminal V24OUT decrease. In the short circuit protection circuit 30, a comparator 32 compares an output-dependent voltage Vs with a reference voltage Vr. Once the output voltage V24OUT is lower than some threshold value, the switch N8 is turn on, and the voltage Vs will have a value related to the output voltage V24OUT. If the voltage Vs is lower than the reference voltage Vr, the comparator 32 triggers the short circuit signal Sc to signal the PWM logic circuit 24 to turn off the power switch N1. After the power switch N1 is turned off, the voltage on the node V24DD will be equal the input voltage VIN again. Consequently, the switches N2, N3 and N4 in the current supply circuit 28 are turned on once more to establish the current mirror which mirrors the reference current I3 to provide a constant short circuit protection current Iout=(I1+I2)×K, as shown by the waveform 54 in FIG. 4.

Referring to FIGS. 2, 3 and 6, when the enable signal EN transits to low so as to shutdown the converter 20, as shown at time t3, the transistor N0 is turned on to slowly decrease the output voltage V24OUT to zero by the resistor R2. At this time, the voltage on the gate of the load disconnecting transistor P1 is slowly pulled toward the voltage on the node V24DD by a resistor R1, so that the voltage VGS between the gate and the source of the load disconnecting transistor P1 slowly decreases to zero, as shown by the waveform 48 in FIG. 3. Finally, the load disconnecting transistor P1 is turned off to disconnect the output voltage terminal V24OUT from the input voltage terminal VIN, thus preventing any current Iout to flow from the input voltage terminal VIN to the output voltage terminal V24OUT. As can be seen from the waveform 64 in FIG. 6, there is no output current Iout when the converter 20 is shutdown.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A non-synchronous boost converter comprising:
    an input voltage terminal;
    an output voltage terminal providing an output voltage;
    an inductor connected between the input voltage terminal and a switched node;
    a diode connected between the switched node and the output voltage terminal;
    a capacitor connected to the output voltage terminal;

a power switch connected to the switched node, for being switched to generate an output current flowing through the inductor and the diode to charge the capacitor to generate the output voltage;

a load disconnecting transistor connected between the diode and the output voltage terminal, for disconnecting the output voltage terminal from the input voltage terminal when the non-synchronous boost converter is shutdown, wherein the load disconnecting transistor is a low-voltage device; and a clamping circuit connected to the load disconnecting transistor, for clamping the voltage between the gate and the source of the load disconnecting transistor under a threshold value.

2. The non-synchronous boost converter of claim 1, further comprising an impedance element connected between the gate and the source of the load disconnecting transistor, for turning off the load disconnecting transistor when the non-synchronous boost converter is shutdown.

3. The non-synchronous boost converter of claim 1, further comprising a short circuit protection circuit connected to the output voltage terminal, for monitoring the output voltage to trigger a short circuit signal to turn off the power switch when the output voltage terminal suffers a short circuit event.

4. The non-synchronous boost converter of claim 3, wherein the short circuit protection circuit comprises a comparator connected to the output voltage terminal, for generating the short circuit signal when the output voltage is lower than a second threshold value.

5. The non-synchronous boost converter of claim 3, further comprising a current supply circuit connected to the output voltage terminal, for providing a short circuit protection current to the capacitor during the short circuit event.

6. The non-synchronous boost converter of claim 5, wherein the current supply circuit comprises a current mirror connected to the output voltage terminal, for mirroring a reference current to generate the short circuit protection current.

7. The non-synchronous boost converter of claim 6, wherein the current mirror comprises a reference branch to establish the reference current and a mirror branch to mirror the reference current to generate the short circuit protection current.

8. The non-synchronous boost converter of claim 7, wherein the mirror branch comprises the load disconnecting transistor.

9. The non-synchronous boost converter of claim 1, further comprising a current supply circuit connected to the output voltage terminal, for providing a pre-charge current to charge the capacitor when the non-synchronous boost converter is enabled.

10. The non-synchronous boost converter of claim 9, wherein the current supply circuit comprises a current mirror connected to the output voltage terminal, for mirroring a reference current to generate the pre-charge current.

11. The non-synchronous boost converter of claim 10, wherein the current mirror comprises a reference branch to establish the reference current and a mirror branch to mirror the reference current to generate the pre-charge current.

12. The non-synchronous boost converter of claim 11, wherein the mirror branch comprises the load disconnecting transistor.

* * * * *